United States Patent [19]

Itoh et al.

[11] Patent Number: 5,298,078
[45] Date of Patent: Mar. 29, 1994

[54] CLEANING COMPOSITION FOR A MOLDING MACHINE AND A CLEANING METHOD

[75] Inventors: Mikihiko Itoh, Yokohama; Narimichi Murahara, Yokosuka, both of Japan

[73] Assignee: Asahi Kasei Kogyo Kabushiki Kaisha, Osaka, Japan

[21] Appl. No.: 794,062

[22] Filed: Nov. 19, 1991

[30] Foreign Application Priority Data

Nov. 20, 1990 [JP] Japan .................. 2-312694

[51] Int. Cl.$^5$ .............................. B08B 7/00
[52] U.S. Cl. .......................... 134/9; 134/6;
252/174.23; 252/174.21; 252/174.22;
252/DIG. 5
[58] Field of Search ............ 252/174.23, 174.21,
252/174.22, 174.25, 174, DIG. 5; 525/313, 242;
524/504, 400; 134/9, 6

[56] References Cited

U.S. PATENT DOCUMENTS

| | | | |
|---|---|---|---|
| 4,020,025 | 4/1977 | Zeitler et al. | 260/2.5 HA |
| 4,537,933 | 8/1985 | Walker et al. | 525/71 |
| 4,731,126 | 3/1988 | Dixit et al. | 134/38 |
| 4,838,945 | 6/1989 | Fujii et al. | 252/174.15 |
| 4,838,948 | 6/1989 | Bailey | 134/8 |
| 5,034,449 | 7/1991 | Mallikarjun | 524/504 |

FOREIGN PATENT DOCUMENTS

| | | |
|---|---|---|
| 0234529 | 9/1987 | European Pat. Off. |
| 1167354 | 7/1989 | Japan . |
| 2180941 | 7/1990 | Japan . |
| 2308900 | 12/1990 | Japan . |
| 1509636 | 5/1978 | United Kingdom . |

*Primary Examiner*—Olik Chaudhuri
*Assistant Examiner*—C. Everhart
*Attorney, Agent, or Firm*—Birch, Stewart, Kolasch & Birch

[57] ABSTRACT

Disclosed is a cleaning composition for use in cleaning the interior of a molding machine having residual molding resin retained therein, comprising (a) a specific graft polymer comprised of a main chain comprising an olefin polymer and having, grafted thereto, a side chain comprising a styrene polymer and (b) a thermoplastic styrene polymer, the graft polymer (a) and the thermoplastic styrene polymer (b) being present in a weight ratio of from 2/100 to 160/100. This cleaning composition exhibits an extremely excellent cleaning effect due to its high capability to scape off a residual resin on a metallic surface. By using this cleaning composition, the cleaning of the interior of a molding machine having a residual molding resin retained therein can be effectively and efficiently performed in a short period of time and at a low cost.

10 Claims, 1 Drawing Sheet

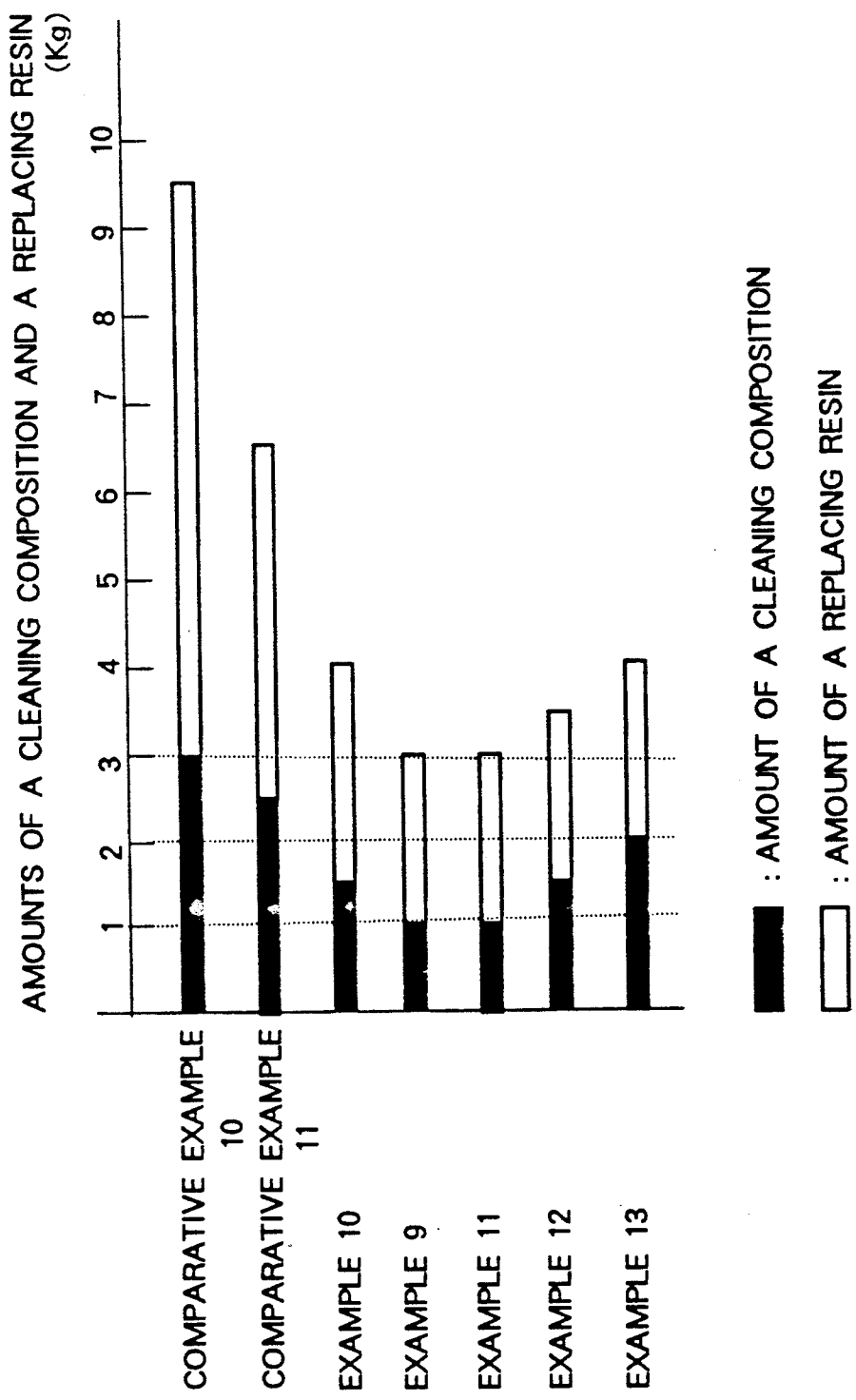

CLEANING COMPOSITION FOR A MOLDING MACHINE AND A CLEANING METHOD

BACKGROUND OF THE INVENTION

1. Field of the Invention

The present invention relates to a cleaning composition for a molding machine and a cleaning method. More particularly, the present invention is concerned with a cleaning composition for a molding machine which comprises a specific graft polymer and a thermoplastic styrene polymer, and a method for cleaning the interior of a molding machine having residual molding resin retained therein, in which the above-mentioned composition is utilized. The cleaning of the interior of the molding machine is required at the time of, for example, changing the type or color of a molding resin. Efficient, complete cleaning is attained by the present invention.

2. Discussion of Related Art

Generally, molding machines, such as an injection molding machine, an extrusion molding machine and a blow molding machine, are used to obtain a shaped article of a resin. When it is intended to change the type or color of a resin to be molded (hereinafter frequently referred to as "molding resin") in which various additives, such as a pigment and a dye, are often incorporated or when it is intended to shut down a molding operation, it is necessary to stop the molding machine. In the stopped molding machine, usually, a portion of the molding resin is retained. Therefore, if a molding resin of different type or color is processed by the molding machine without removing residual molding resin retained therein, a molded article is caused to have poor appearance and poor properties due to the mixing of the residual molding resin into the molded article. Further, even if the same molding resin is employed, when the molding is conducted without removing residual molding resin retained therein after the molding machine has been stopped for a certain period of time, a molded article has also poor appearance and poor properties due to the mixing of the residual molding resin, which has been decomposed or denaturized, into the molded article.

In the art, the residual molding resin retained in a molding machine has conventionally been removed by the following methods. One method is to disassemble the molding machine and manually clean the interior of the molding machine. Another method consists in charging a molding machine having residual molding resin retained in the interior thereof, with a resin to be used for a subsequent molding operation and operating the molding machine to pass the resin through the molding machine to thereby remove and withdraw the residual molding resin. A further method consists in charging a molding machine having residual molding resin retained in the interior thereof with a cleaning composition, operating the molding machine to pass the cleaning composition through the molding machine to thereby remove and withdraw the residual molding resin, while causing a part of the cleaning composition to be retained as a residual cleaning composition in the interior of the molding machine, charging the molding machine having the residual cleaning composition retained therein with a fresh molding resin, and operating the molding machine to replace the residual cleaning composition with the fresh molding resin.

The above-mentioned known cleaning compositions are (1) a composition (semi-melt type) comprising an acrylic resin having a superhigh molecular weight and, contained therein, a foaming agent, kaolin and calcium carbonate, (2) a composition (complete melt type) comprising a resin containing a surfactant, and (3) a composition (blend type) comprising a metallic soap containing a foaming agent, which is adapted to be blended with a resin before use in the cleaning of a molding machine.

However, all of the above conventional cleaning methods have inherent drawbacks. That is, the manual method in which the molding machine is disassembled, has drawbacks in that the workers' time is gravely wasted, thereby causing productivity to be low. Further, in this manual method, residual molding resin is likely to remain in some particular regions of the molding machine, for example, on the inner wall of a cylinder, where disassembly of parts is difficult for a structural reason.

In the method in which the removal of residual molding resin is performed by the use of a resin to be used for a subsequent molding operation, the cleaning effect of the resin is so low that a large amount of the resin is wasted, and that a long period of time is consumed for cleaning, because such a resin is generally suitable for molding but not for cleaning. Further, some types of residues retained in a molding machine, such as thermal decomposition products of rubbers, cannot be easily removed by this method.

In the method in which the removal of residual molding resin is performed by the use of a cleaning composition, all of the known cleaning compositions have serious drawbacks, which render it difficult to put the conventional cleaning compositions in practical use. That is, in the case of the semi-melt type cleaning composition (1), the composition itself is likely to remain as a residue in the interior of a molding machine, which residue is likely to get mixed into a fresh molding resin, thereby causing the final shaped article to have poor properties. In the case of the complete melt type cleaning composition (2), it has poor cleaning effect, and it is also likely to remain as a residue in the interior of a molding machine, causing the satisfactory removal of the residue to be troublesome and time-consuming. In the case of the blend type cleaning composition (3), it usually needs to be blended with a molding resin before use. This composition also has poor cleaning effect, and the prior blending with a molding resin is disadvantageous from the viewpoint of production efficiency. In the case of this blend type cleaning composition, best results are obtained when the type of a molding resin to be blended with the cleaning composition in the prior blending is the same as that of the residual molding resin to be removed. Accordingly, when a wide variety of molding resins are employed in a molding workshop, this disadvantageously makes it necessary to prepare a wide variety of cleaning compositions.

In the method in which the removal of residual molding resin is performed by the use of a cleaning composition, the residual cleaning composition remaining in the interior of a molding machine must be replaced with a fresh molding resin before molding the fresh molding resin, as mentioned above. Therefore, the cleaning composition must have not only high removing effect on a molding resin employed in the molding prior to the cleaning with the cleaning composition, but also high replaceability with a fresh molding resin to be employed in the molding subsequent to the cleaning with the cleaning composition. However, all of the conventional cleaning compositions are unsatisfactory not only in the cleaning effect but also in the replaceability with a fresh molding resin.

For example, when a molding machine having been used for molding a styrene resin is cleaned by the use of a blend type cleaning composition (which has been blended with a styrene resin) and used for molding an olefin resin, it is generally observed that replacing of the cleaning composition with the olefin molding resin is difficult, thereby causing a large amount of an olefin molding resin and a long period of time to be consumed for the replacing of the cleaning composition. The similar observation is made when a molding machine having been used for molding an olefin resin is cleaned by the use of a blend type cleaning composition (which has been blended with an olefin resin) and used for molding a styrene resin.

Styrene resins and olefin resins are plastics which are most frequently employed for molding, and hence it is frequently encountered that a molding machine having been used for molding an olefin resin must be cleaned for a subsequent molding of a styrene resin, and that a molding machine having been used for molding of a styrene resin must be cleaned for a subsequent molding of an olefin resin. Therefore, there has been a strong demand in the art for a cleaning composition capable of exhibiting not only excellent removing effect for residual molding resin retained in the interior of a molding machine but also excellent replaceability with a fresh molding resin to be used for subsequent molding operation.

SUMMARY OF THE INVENTION

With a view toward developing a cleaning composition exhibiting not only excellent cleaning effect but also excellent replaceability with a molding resin to be used for a subsequent molding operation, the present inventors have made extensive and intensive studies. As a result, the present inventors have surprisingly found that a composition comprising a graft polymer, which is comprised of an olefin polymer as a main chain and a styrene polymer as a side chain grafted to the main chain, and a thermoplastic styrene polymer, is markedly less adherent to a metal, for example, a metal constituting the interior (in particular, a cylinder portion) of a molding machine, as compared to styrene polymers and olefin polymers. Further, it has surprisingly been found that such a composition effectively scrapes off residual molding resin from the inner wall of the interior of the molding machine, without sticking to the same, to thereby exhibit high cleaning effect. Still further, it has been found that such a composition exhibits excellent replaceability with molding resins to be used for molding subsequent to the cleaning of the molding machine. Based on these findings, the present invention has been completed.

Accordingly, it is an object of the present invention to provide a cleaning composition to be used for cleaning the interior of a molding machine having residual molding resin retained therein, which exhibits not only excellent cleaning effect but also excellent replaceability with molding resins.

It is another object of the present invention to provide a method in which the above-mentioned cleaning composition is used for effectively, efficiently cleaning the interior of a molding machine having residual molding resin retained therein.

The foregoing and other objects, features and advantages of the present invention will be apparent from the following detailed description and appended claims taken in connection with the accompanying drawing.

BRIEF DESCRIPTION OF THE DRAWING

In the accompanying drawing:

FIG. 1 is a graph showing the effect of the formulation of cleaning compositions on the amount of cleaning composition required in a cleaning operation and on the amount of fresh molding resin (replacing resin) required in a replacing operation for a molding machine.

DETAILED DESCRIPTION OF THE INVENTION

In one aspect of the present invention, there is provided a cleaning composition for use in cleaning the interior of a molding machine having residual molding resin retained therein, comprising (a) a graft polymer comprised of a main chain comprising an olefin polymer and having, grafted thereto, a side chain comprising a styrene polymer and (b) a thermoplastic styrene polymer, the graft polymer (a) being present in an amount of from 2 to 160 parts by weight per 100 parts by weight of the thermoplastic styrene polymer (b).

The graft polymer (a) used in the composition of the present invention is comprised of a main chain comprising an olefin polymer and having, grafted thereto, a side chain comprising a styrene polymer.

Representative examples of olefin polymers forming the main chain of the graft polymer (a) include polyethylene, polypropylene and an ethylene-propylene copolymer. Other examples of olefin polymers include olefin copolymers of at least one monomer selected from the group consisting of ethylene and propylene with at least one comonomer selected from the group consisting of vinyl acetate, acrylonitrile, glycidyl methacrylate, ethyl acrylate, styrene and the like. Each of the olefin copolymers contains units of at least one monomer selected from the group consisting of ethylene and propylene in an amount of at least 50% by weight, based on the weight of the olefin copolymer. It is preferred that the olefin polymer be selected from polyethylene, polypropylene and an ethylene-propylene copolymer.

Representative examples of styrene polymers forming the side chain of the graft polymer (a) include polystyrene and copolymers of styrene with at least one comonomer selected from the group consisting of acrylonitrile, butadiene, methyl acrylate and the like. Each of the styrene polymers preferably contains styrene units in an amount of at least 50% by weight, based on the weight of the styrene polymer. It is most preferred that the styrene polymer be a copolymer of styrene with acrylonitrile.

In the graft polymer (a) used in the cleaning composition of the present invention, the respective proportions of the olefin polymer of the main chain and the styrene polymer of the side chain grafted to the main chain are not particular limited. It is generally preferred, however, that the olefin polymer be present in an amount of from 15 to 95% by weight, more preferably from 20 to 80% by weight, and most preferably from 40 to 60% by weight, based on the weight of the graft polymer (a).

The graft polymer (a) can be readily produced by a customary method for producing a conventional graft polymer. Any customary method can be employed as long as the produced graft polymer can satisfactorily be employed as the graft polymer (a).

For example, a graft polymer (a) can be produced by the following method. An active site for grafting is first formed in a polymer constituting a main chain (or a side chain) by a customary technique, such as treatment with a peroxide, ultraviolet ray irradiation, high-energy radiation, copolymerization with a peroxide monomer (i.e., a monomer having both a polymerizable double bond and an active peroxy portion in one molecule), and heat treatment in air. Then, the resultant polymer constituting a main chain (or a side chain) having formed therein an active site for grafting is contacted with a material for constituting a side chain (or a main chain), including a polymer, a copolymer, a monomer and a monomer mixture, under predetermined conditions. Thus, a graft polymer can be obtained.

Alternatively, the graft polymer (a) may be produced by other methods. For example, the graft polymer (a) can be produced by a method in which a monomer mixture of styrene and acrylonitrile is added to powdery polypropylene which has been irradiated with gamma rays, followed by heat polymerization, and then any unreacted monomer is removed by methanol extraction. Further, the graft polymer (a) can be produced by a method in which powdery polypropylene is impregnated with a monomer mixture of styrene, acrylonitrile, t-butyl peroxymethacryloyloxyethyl carbonate (as a peroxide monomer) and ethyl carbonate, to which benzoyl peroxide (as a polymerization catalyst) has been added, followed by polymerization at 50° C. to 100° C. for about 10 hours, whereupon any unreacted monomer is removed, and the resultant product is subjected to melt-kneading by means of a plastomill at about 160° C. to effect grafting.

In the graft polymer (a) used in the composition of the present invention, it is preferred that the olefin polymer constituting a main chain of the graft polymer (a) have a melt flow rate, as measured by the method described later, of from 5 to 50 g/10 min and the styrene polymer constituting a side chain of the graft polymer (a) have a melt flow rate of 2 to 80 g/10 min.

The cleaning composition of the present invention comprises the above-mentioned graft polymer (a) and a thermoplastic styrene polymer (b).

In the composition of the present invention, the graft polymer (a) is present in an amount of from 2 to 160 parts by weight, preferably 2 to 100 parts by weight, more preferably 5 to 80 parts by weight per 100 parts by weight of the thermoplastic styrene polymer (b) In the present invention, it is preferred that the thermoplastic styrene polymer (b) contain styrene units in an amount of at least 50% by weight, based on the weight of the polymer (b). As preferred examples of thermoplastic styrene polymers (b) containing styrene units in an amount of at least 50% by weight, polystyrene, a styrene copolymer and a styrene terpolymer can be mentioned.

Examples of styrene copolymers which can be suitably employed as the thermoplastic styrene polymer (b) include a styrene-acrylonitrile copolymer. Examples of styrene terpolymers which can be suitably employed as the thermoplastic styrene polymer (b) include a styrene-butadiene-acrylonitrile terpolymer. Of these copolymers and terpolymers, particularly preferred is a styrene-acrylonitrile copolymer. Further, from the viewpoint of attaining a high cleaning effect and less residence of the copolymer in a molding machine, it is preferred that the styrene-acrylonitrile copolymer contain acrylonitrile units in an amount of from 5 to less than 50% by weight, based on the weight of the copolymer.

In the cleaning composition of the present invention, it is preferred that the thermoplastic styrene polymer (b) have a melt flow rate of from 0.5 to 30 g/10 min. When the melt flow rate of the thermoplastic styrene polymer (b) is less than 0.5 g/10 min, it is difficult to use the composition under customary molding conditions, for example, at a molding temperature of 200° to 280° C. Whereas when the melt flow rate is larger than 30 g/10 min, it is difficult to attain a satisfactory cleaning effect.

The terminology "melt flow rate" used herein means a value as measured at 220° C. under a load of 10 kg in accordance with Japanese Industrial Standard K7210.

In producing the cleaning composition of the present invention, the graft polymer (a) is mixed with the thermoplastic styrene polymer (b). The manner of the mixing is not particularly limited. The mixing of the graft polymer (a) with the thermoplastic styrene polymer (b) can be performed by simply mixing the graft polymer (a) in a pellet form and the thermoplastic styrene polymer (b) in a pellet form with each other, for example, by means of a blender. However, from the viewpoint of attaining a higher effect of cleaning, it is preferred that the graft polymer (a) and the thermoplastic styrene polymer (b) be mixed with each other by melt-kneading these components (a) and (b), for example, by means of an extruder into a pelletized form.

In the present invention, the cleaning composition may further comprise as a diluent resin at least one other resin than essential polymers (a) and (b), as long as 2 to 160 parts by weight of graft polymer (a) is contained in the composition per 100 parts by weight of thermoplastic styrene polymer (b). The diluent resin is used in an amount of less than 50% by weight, based on the total weight of the graft polymer (a) and the thermoplastic styrene polymer (b), with the proviso that the amount of the graft polymer (a) is not less than 2 parts by weight, preferably not less than 5 parts by weight per 100 parts by weight of the total of the thermoplastic styrene polymer (b) and the diluent resin.

The types of optional diluent resins are not particularly limited as long as the diluent resins is of types which are different from the graft polymer (a) and the thermoplastic styrene polymer (b). Thus, the diluent resin may be selected from a wide variety of resins which are generally employed in injection molding and extrusion molding. Examples of resins suitably employable as the diluent resin include polyethylene, polypropylene, polymethyl methacrylate, polyvinyl chloride, polyamide resins, polycarbonate and polybutene. It is preferred that the diluent resin be of a type which is identical to the type of the molding resin employed in the molding prior to the cleaning with the cleaning composition and/or the type of the molding resin to be subjected to the molding machine after the cleaning with the cleaning composition. It is also preferred that the diluent resin have a melt flow rate of from 0.5 to 30 g/10 min, as in the case of the thermoplastic styrene polymer (b).

The manner of mixing the essential components (a) and (b) of the composition of the present invention and the optional diluent resin with one another is not particularly limited. The essential components (a) and (b) of the composition can be subjected to melt-kneading together with the diluent resin to thereby produce a pelletized product in which the essential components and the diluent resin are uniformly blended with one another. Alternatively, pellets obtained by melt-kneading the essential components (a) and (b) can be simply mixed with pellets of the diluent resin.

It is preferred that the cleaning composition of the present invention further comprise an alkali metal salt as a lubricant. Examples of alkali metal salts include a metal stearate, such as magnesium stearate.

By the incorporation of the alkali metal salt, not only does the composition of the present invention become less likely to be undesirably retained as a residual cleaning composition in the interior of the molding machine, but also it becomes easier to remove any undesired residual portion of the cleaning composition from the interior of the molding machine. The alkali metal salt is preferably incorporated in an amount of 0.1 to 10 parts by weight per 100 parts by weight of the total of the essential components (a) and (b). When the cleaning composition contains the above-mentioned diluent resin, it is preferred that the amount of the alkali metal salt be 0.1 to 10 parts by weight per 100 parts by weight of the total of the essential components (a) and (b) and the diluent resin.

The alkali metal salt can be mixed with at least one member selected from the group consisting of the graft polymer (a), the thermoplastic styrene polymer (b) and the optional diluent resin. Further, the alkali metal salt can be introduced into the molding machine separately from the essential components of the cleaning composition at the time of use of the composition, thereby mixing the alkali metal salt and the essential components of the cleaning composition in the interior of the molding machine. From the viewpoint of increasing the effect of the alkali metal salt, it is preferred that the alkali metal salt be previously kneaded together with both of the essential components, i.e., the graft polymer (a) and the thermoplastic styrene polymer (b).

Illustratively stated, the kneading of the alkali metal salt together with the essential components of the composition of the present invention may be effected, for example, by a method in which the alkali metal salt is preliminary blended with at least one of the graft polymer (a) and the thermoplastic styrene polymer (b) and a predetermined amount of the resultant preliminary blend is introduced into an extruder at its hopper (together with the remaining essential component when the preliminary blend contains only one of the essential components in addition to the alkali metal salt), followed by effecting kneading of the blend.

It is preferred that the cleaning composition of the present invention further comprise a foaming agent. The incorporation of the foaming agent further improves the cleaning effect of the composition. Examples of foaming agents include inorganic foaming agents, such as sodium bicarbonate and ammonium carbonate, and organic foaming agents, such as azodicarbonamide and azobisisobutyronitrile. The foaming agent is used preferably in an amount of 0.1 to 4 parts by weight per 100 parts by weight of the total of the graft polymer (a) and the thermoplastic styrene polymer (b). When the diluent resin is employed, the amount of the foaming agent is preferably 0.1 to 4 parts by weight per 100 parts by weight of the total of the graft polymer (a), the thermoplastic styrene polymer (b) and the diluent resin. It is especially preferred that the foaming agent be employed together with the alkali metal salt.

The foaming agent can be blended into at least one member selected from the group consisting of a graft polymer (a), a thermoplastic styrene polymer (b) and a diluent resin before they are blended to form the cleaning composition of the present invention. Alternatively, the foaming agent can be blended into the prepared cleaning composition just before the use thereof. Preferably, the foaming agent is blended into a blend of graft polymer (a) and thermoplastic styrene polymer (b). This is preferred from the viewpoint of improving its addition effect. When the melt flow rate of the blend of graft polymer (a) and thermoplastic styrene polymer (b) is too low, for example, 30 g/10 min or below, foaming occurs at the time of the blending of the foaming agent, thereby causing incorporation of the foaming agent to be difficult. In this case, it is preferred that the foaming agent be first blended into a diluent resin having a relatively high melt flow rate, for example, 50 g/10 min or above, and then, the resultant resin be blended with the blend of graft polymer (a) and thermoplastic styrene polymer (b). Concurrently with the blending of the foaming agent, the above-mentioned alkali metal salt may be blended into the diluent resin.

Preferably, the cleaning composition of the present invention further comprises water. This water is vaporized in a molding machine when exposed to a high temperature, and helps in the scraping off of the residual molding resin from the interior of the molding machine.

It is preferred that water be adsorbed on graft polymer (a) and thermoplastic styrene polymer (b) utilizing water adsorption properties of polymers (a) and (b) Alternatively, a porous graft polymer (a) and a porous thermoplastic styrene polymer (b) are employed, and water is occluded in porous polymers (a) and (b). By the above-mentioned adsorption and occlusion of water, separation of the water from polymers (a) and (b) of the cleaning composition can be prevented at the time of charging a molding machine with the cleaning composition. When water is only loosely adhered to the cleaning composition, the water is likely to be separated at the time of charging a molding machine with the cleaning composition to thereby cause separated water to adhere to the interior of a hopper provided on a molding machine or to be pooled in a lower portion of the hopper or a region just beneath the same. Such adhesion and pooling of water cause a molding resin to be wetted, and such wetting adversely affects the molding of the molding resin. This can be prevented by drying and wiping, which are, however, extremely troublesome.

When a diluent resin is blended with graft polymer (a) and thermoplastic styrene polymer (b), water may be contained in the diluent resin.

The cleaning composition of the present invention preferably comprises water in an amount of from 0.2 to 10 parts by weight per 100 parts by weight of the total of graft polymer (a) and thermoplastic styrene polymer (b). When a diluent resin is blended with graft polymer (a) and thermoplastic styrene polymer (b), water is preferably contained in an amount of from 0.2 to 10 parts by weight per 100 parts by weight of the total of graft polymer (a), thermoplastic styrene polymer (b) and the diluent resin. When the amount of water is too small, i.e., less than 0.2 part by weight, the effect of the incorporation of water cannot be expected. On the other hand, when the amount of water is too large, i.e., larger than 10 parts by weight, a cleaning operation becomes mechanically difficult to conduct.

The cleaning composition of the present invention preferably further comprises a glass fiber, because the glass fiber improves cleaning effect. Examples of glass fibers include glass fibers commercially available as glass fibers for plastic reinforcement. The length and diameter of the glass fiber can be the same as those of the glass fiber commercially available as a glass fiber for plastic reinforcement. Examples of such glass fibers are disclosed in Japanese Patent Application Publication Specification No. 53-41711/1978.

In place of the above-mentioned glass fibers, glass granules can be used in the present invention. Glass granules having an average size of from 10 to 200 μm are preferably used. Representative examples of glass granules include a glass powder, glass beads, SHIRA-SU-balloons (a balloon made of volcanic ash), quicksand and the like.

Glass fibers or glass granules are preferably blended into at least one member selected from the group consisting of graft polymer (a), thermoplastic styrene polymer (b) and a diluent resin before they are blended to form the cleaning composition of the present invention. This advantageously prevents the glass fibers or the glass granules from adhering to and remaining in a hopper provided on a molding machine and a region just below the hopper.

The cleaning composition of the present invention preferably comprises glass fibers in an amount of from 5 to 100 parts by weight per 100 parts by weight of the total of graft polymer (a) and thermoplastic styrene polymer (b). When a diluent resin is blended with graft polymer (a) and thermoplastic styrene polymer (b), a glass fiber is preferably contained in an amount of from 5 to 100 parts by weight per 100 parts by weight of the total of graft polymer (a), thermoplastic styrene polymer (b) and the diluent resin.

The cleaning composition of the present invention preferably comprises glass granules in an amount of from 5 to 120 parts by weight per 100 parts by weight of the total of graft polymer (a) and thermoplastic styrene polymer (b). When a diluent resin is blended with graft polymer (a) and thermoplastic styrene polymer (b), glass granules are preferably contained in an amount of from 5 to 120 parts by weight per 100 parts by weight of the total of graft polymer (a), thermoplastic styrene polymer (b) and the diluent resin.

In using the cleaning composition of the present invention, the molding machine having residual molding resin retained therein is charged with the cleaning composition and operated to pass the cleaning composition through the molding machine, thereby removing and withdrawing substantially all of the residual molding resin and causing a part of the cleaning composition to be retained as a residual cleaning composition in the interior of the molding machine and then, the molding machine having the residual cleaning composition retained therein is charged with a fresh molding resin and operated to replace the residual cleaning composition with the fresh molding resin, thereby removing and withdrawing the residual cleaning composition.

Accordingly, in another aspect of the present invention, there is provided a method for cleaning the interior of a molding machine having residual molding resin retained therein, which comprises:

(1) charging a molding machine having a residual molding resin retained in the interior thereof with a cleaning composition, the cleaning composition comprising (a) a graft polymer comprised of a main chain comprising an olefin polymer and having, grafted thereto, a side chain comprising a styrene polymer and (b) a thermoplastic styrene polymer, the graft polymer (a) being present in an amount of from 2 to 160 parts by weight per 100 parts by weight of the thermoplastic styrene polymer (b), (2) operating the molding machine to pass the cleaning composition through the molding machine, thereby removing and withdrawing substantially all of the residual molding resin to the outside of the molding machine and causing a part of the cleaning composition to be retained as a residual cleaning composition in the interior of the molding machine, (3) charging the molding machine having the residual cleaning composition retained therein with a fresh molding resin, and (4) operating the molding machine to replace the residual cleaning composition with the fresh molding resin, thereby removing and withdrawing the residual cleaning composition to the outside of the molding machine.

Representative examples of molding machines which can be effectively cleaned by the method of the present invention include an injection molding machine, an extrusion molding machine, a blow molding machine, a calender molding machine and other molding machines having a cylinder portion in which resin compositions are heated and kneaded. Especially, the method of the present invention is most advantageously applied to the cleaning of an injection molding machine. When a molding machine having a vent is cleaned, it is preferred to charge the molding machine with a portion of the cleaning composition through the vent.

With respect to steps (1) to (4) of the method of the present invention, the charging and operating conditions are not particularly limited, and those generally employed in the conventional plastic molding can be employed.

Referring to an injection molding machine, particular explanations on the cleaning operation are made as follows.

In steps (1) and (2), the temperature of the cylinder portion of the molding machine may be identical with that employed in the molding of a molding resin prior to the cleaning operation. At such a temperature, the residual molding resin can be effectively scraped off by the cleaning composition of the present invention which is flowable over a wide range of temperatures. For example, when the molding resin employed prior to the cleaning operation is polystyrene, polypropylene, polymethyl methacrylate or polyacetal, the temperature of the cylinder portion of the molding machine is preferably in the range of from 180° to 230° C. When the molding resin employed prior to cleaning operation is an acrylonitrile-butadiene-styrene terpolymer or a styrene-acrylonitrile copolymer, the temperature of the cylinder portion of the molding machine is preferably in the range of from 230° to 250° C. When the molding resin employed prior to cleaning operation is a grafted polyphenylene ether, polycarbonate or nylon, the temperature of the cylinder portion of the molding machine is preferably in the range of from 250° to 310° C.

The amount of the cleaning composition to be charged into the molding machine depends mainly on the purpose (color change, molding resin change, or residue removal), the type of the residual molding resin retained in the interior of the molding machine and the capacity (maximum injection shot weight) of the molding machine. The optimum amount of the cleaning composition can be determined by preliminary trials with the individual molding machine. For example, when cleaning is conducted after molding polystyrene with respect to an injection molding machine having a cylinder temperature of 180° to 230° C. and having a machine capacity of 10-oz shot weight, the optimum amount of the cleaning composition may be about 0.7-1.0 kg. Further, when cleaning is conducted after molding a styrene-acrylonitrile copolymer with respect to an injection molding machine having a cylinder temperature of 230° to 250° C. and having a machine capacity of 10-oz shot weight, the optimum amount of the cleaning composition may be about 1.5-2.0 kg.

Generally, the greater the internal pressure of the cylinder portion of the molding machine, the greater the cleaning effect of the cleaning composition of the present invention. The increase of the internal pressure can be achieved by lowering the cylinder temperature as long as the cleaning composition can flow to pass through the cylinder portion of the molding machine, by applying back pressure or by performing high speed injection.

In steps (3) and (4), the temperature of the cylinder portion of the molding machine depends on the type of the fresh molding resin. For example, when the fresh molding resin is polystyrene, the temperature is preferably in the range of from 180° to 230° C. In this connection, the explanation made above with respect to steps (1) and (2) can be referred to. The amount of the fresh molding resin to be charged into the molding machine is about the same as the amount of the cleaning composition used in steps (1) and (2).

In step (4) of the method of the present invention, the residual cleaning composition retained in the molding machine is replaced with the fresh molding resin in accordance with the operation of the molding machine, and removed and withdrawn to the outside of the molding machine. Simultaneously with the removal and withdrawal of the residual cleaning composition, the molding machine is caused to be loaded with the fresh molding resin. In the present invention, however, step (4) for replacing the residual cleaning composition with and loading the molding machine with the fresh molding resin, is a final step for cleaning the molding machine until the replacement and withdrawal of the residual cleaning composition are completed.

As described above, the cleaning composition of the present invention, which is comprised of a graft polymer comprising an olefin polymer main chain and a styrene polymer side chain and a thermoplastic styrene polymer, is markedly less adherent to a metal, for example a metal constituting the interior (in particular, a cylinder portion) of a molding machine, as compared to styrene polymers and olefin polymers. The cleaning composition effectively scrapes off residual molding resin from the interior of the molding machine, without sticking to the same, to thereby exhibit high cleaning effect. Further, the cleaning composition of the present invention exhibits excellent replaceability with molding resins. Accordingly, the method of the present invention in which this cleaning composition is employed, ensures efficient cleaning of the interior of a molding machine.

PREFERRED EMBODIMENT OF THE INVENTION

The present invention will now be described in more detail with reference to the following Examples and Comparative Examples, which should not be construed to be limiting the scope of the present invention.

The molding machine, molding temperature and measuring method which are employed in the following Examples and Comparative Examples are as follows.
(1) Molding machine: In-line screw type injection molding machine (clamping force: 125 tons, capacity in terms of maximum injection shot weight: 10 ounces) is used.
(2) Molding temperature: Molding temperature for each of Examples and Comparative Examples is shown in Tables 2 and 3.
(3) Melt flow rate: Measurement of a melt flow rate is carried out in accordance with JIS-K7210.
(4) Acrylonitrile (AN) content: Measurement of an AN content is carried out by infrared spectrophotometry.

The composition of each polymer to be blended with a thermoplastic styrene polymer to prepare a cleaning composition is described in Table 1 together with the character used for identifying the polymer.

TABLE 1

| Character | Composition of a polymer to be blended with a thermoplastic styrene polymer to prepare a cleaning composition (the main chain/side chain weight ratio) |
|---|---|
| $a_1$ | A graft polymer comprised of polypropylene as a main chain and a styrene-acrylonitrile copolymer as a side chain (50/50) |
| $a_2$ | A graft polymer comprised of polypropylene as a main chain and polystyrene as a side chain (50/50) |
| $a_3$ | A graft polymer comprised of polypropylene as a main chain and a styrene-acrylonitrile copolymer as a side chain (70/30) |
| $a_4$ | A graft polymer comprised of polypropylene as a main chain and a styrene-acrylonitrile copolymer as a side chain (90/10) |
| $b_1$ | A graft polymer comprised of polymethyl methacrylate as a main chain and a styrene-acrylonitrile copolymer as a side chain (50/50) |
| $b_2$ | Polypropylene |

In Tables 2 and 3 described below, the terminology "molding operation" defines an operation in which a molding machine is charged with 1 kg of a molding resin which has been black-colored with a green carbon powder (0.5% by weight), and operated to produce a molded article while causing a part of the black-colored resin to be retained as a residual resin in the interior of the molding machine; the terminology "cleaning operation (A)" defines an operation in which a cleaning composition or a cleaning agent is passed through the molding machine, thereby removing substantially all of the residual black-colored resin and causing a part of the cleaning composition or agent to be retained as a residual cleaning composition or agent; and the terminology "replacing operation (B)" defines an operation in which a fresh molding resin (replacing resin) is passed through the molding machine to replace the residual cleaning composition or agent with the fresh molding resin, thereby removing and withdrawing the residual cleaning composition or agent and any residual part of the black-colored molding resin.

EXAMPLE 1

1.0 kg of Stylac ABS 121 [tradename of a styrenebutadiene-acrylonitrile terpolymer (hereinafter referred to as "ABS") manufactured and sold by Asahi Kasei Kogyo Kabushiki Kaisha, Japan] which has been black-colored with 0.5% by weight of Mitsubishi Carbon #50 (tradename of a green carbon powder manufactured and sold by Mitsubishi Chemical Industry Co., Japan), is charged into an injection molding machine and the injection molding machine is operated, thereby producing a molded product while causing the black-colored molding ABS resin to be retained as a residual resin in the interior of the molding machine. Thus, the molding operation is completed.

Separately, 100 parts by weight of a styreneacrylonitrile copolymer (hereinafter referred to as "AS") having a melt flow rate of 3 g/10 min and having an acrylonitrile (hereinafter referred to as "AN") content of 34% by weight and 11 parts by weight of a graft polymer ($a_1$) comprised of a main chain of Asahi Kasei Polypropylene [tradename of polypropylene (hereinafter referred to as "PP") manufactured and sold by Asahi Kasei Kogyo K.K., Japan] and having, grafted thereto, a side chain of Stylac AS 789 (tradename of AS manufactured and sold by Asahi Kasei Kogyo Kabushiki Kaisha, Japan)(PP: 50% by weight; AS: 50% by weight) are mixed and melt-kneaded in an extruder at about 230° C., thereby obtaining a cleaning composition of the present invention.

1.0 kg of the cleaning composition is charged into the above-operated injection molding machine and the molding machine is operated to pass the cleaning composition through the molding machine, thereby removing and withdrawing substantially all of the residual black-colored molding resin to the outside of the molding machine and causing a part of the cleaning composition to be retained as a residual cleaning composition in the interior of the molding machine, thereby performing the cleaning operation (A). The time between the start and the end of the discharge of the cleaning composition together with any residual molding resin from the molding machine is measured.

After completion of the cleaning operation (A), the replacing operation (B) is performed by charging a fresh molding resin, which is a general-purpose, colorless molding PP resin, into the molding machine having the residual cleaning composition retained in the interior thereof and operating the molding machine to replace the residual cleaning composition retained in the interior of the molding machine with the fresh molding resin, thereby removing and withdrawing the residual cleaning composition to the outside of the molding machine. The time of the operation which needs to be conducted until the fresh molding resin withdrawn from the molding machine contains no trace of the black-colored ABS molding resin (which can be visually confirmed), and the amount of the fresh molding resin used during such time are measured.

Results are shown in Table 2.

COMPARATIVE EXAMPLE 1

Substantially the same procedure as in Example 1 is repeated except that, after the molding operation using the same black-colored ABS molding resin as used in Example 1, the molding machine having a residual black-colored ABS resin retained therein is charged with a fresh molding resin which is a general-purpose, colorless molding PP resin, and then, the molding machine is operated until no trace of the black-colored resin is observed in the fresh resin withdrawn from the molding machine.

Results are shown in Table 2.

EXAMPLE 2

Substantially the same procedure as in Example 1 is repeated except that PP containing 0.5% by weight of a green carbon powder is used as the black-colored molding resin in the molding operation conducted prior to the cleaning operation (A), that the cleaning operation (A) is performed by using 0.5 kg of a cleaning composition prepared by kneading 11 parts by weight of the same graft polymer ($a_1$) as used in Example 1 together with 100 parts by weight of an AS resin having a melt flow rate of 3 g/10 min and having an AN content of 20% by weight and that the replacing operation (B) is performed by using a general-purpose, colorless molding material comprised of ABS.

Results are shown in Table 2.

COMPARATIVE EXAMPLE 2

Substantially the same procedure as in Example 2 is repeated except that, after the molding operation using the same black-colored molding PP resin as used in Example 2, the molding machine having a residual black-colored PP resin retained therein is charged with a fresh molding resin, which is a general-purpose, colorless molding ABS resin and then, the molding machine is operated until no trace of the black-colored resin is observed in the fresh resin withdrawn from the molding machine.

Results are shown in Table 2.

EXAMPLE 3

1.0 kg of Styron 666 [tradename of polystyrene (hereinafter referred to as "PS") manufactured and sold by Asahi Kasei Kogyo Kabushiki Kaisha, Japan] which has been black-colored with 0.5% by weight of Mitsubishi Carbon #50, is charged into an injection molding machine and the injection molding machine is operated, thereby producing a molded product while causing the black-colored molding PS resin to be retained as a residual resin in the interior of the molding machine.

1.0 kg of an additive-containing cleaning composition prepared by kneading 100 parts by weight of the same cleaning composition as used in Example 2 together with 0.5 part by weight of magnesium stearate is charged into the above-operated injection molding machine and the molding machine is operated to pass the cleaning composition through the molding machine, thereby removing and withdrawing substantially all of the residual black-colored molding resin to the outside of the molding machine and causing a part of the cleaning composition to be retained as a residual cleaning composition in the interior of the molding machine, thereby performing the cleaning operation (A). The time between the start and the end of the discharge of the cleaning composition together with any residual molding resin from the molding machine is measured.

After completion of the cleaning operation (A), the replacing operation (B) is performed by using a fresh molding resin, which is a general-purpose, colorless molding PP resin, in the same manner as in Example 1.

Results are shown in Table 2.

COMPARATIVE EXAMPLE 3

Substantially the same procedure as in Example 3 is repeated except that the cleaning operation (A) is conducted by using as a cleaning agent 6.5 kg of an AS resin having a melt flow rate of 35 g/10 min and having an AN content of 30% by weight.

Results are shown in Table 2.

EXAMPLE 4

Substantially the same procedure as in Example 1 is repeated except that Xyron 500V [tradename of grafted polyphenylene ether (hereinafter referred to as "PPE") manufactured and sold by Asahi Kasei Kogyo Kabushiki Kaisha, Japan] containing 0.5% by weight of Mitsubishi Carbon #50 is used as the black-colored molding resin in the molding operation conducted prior to the cleaning operation (A) and that the cleaning operation (A) is performed by using 1.5 kg of an additive-containing cleaning composition prepared by kneading 100 parts by weight of the same cleaning composition as used in Example 2 together with 25 parts by weight of a glass fiber.

Results are shown in Table 2.

COMPARATIVE EXAMPLE 4

Substantially the same procedure as in Example 4 is repeated except that, after the molding operation using the same black-colored molding PPE resin as used in Example 4, the molding machine having a residual black-colored PPE resin retained therein is charged with a fresh molding resin, which is a general-purpose, colorless molding PP resin and then, the molding machine is operated until no trace of the black-colored resin is observed in the fresh resin withdrawn from the molding machine.

Results are shown in Table 2.

EXAMPLE 5

Substantially the same procedure as in Example 1 is repeated except that the cleaning operation (A) is performed by using 1.0 kg of a cleaning composition prepared by kneading 5 parts by weight of the same graft polymer ($a_1$) as used in Example 1 together with 100 parts by weight of the same AS resin as used as the thermoplastic styrene resin component for preparing the cleaning composition in Example 1.

Results are shown in Table 2.

COMPARATIVE EXAMPLE 5

Substantially the same procedure as in Example 5 is repeated except that the cleaning operation (A) is performed by using 2.0 kg of a cleaning composition prepared by mixing 2.5 parts by weight of a PP powder ($b_2$) with 100 parts by weight of an AS resin.

Results are shown in Table 2.

EXAMPLE 6

Substantially the same procedure as in Example 1 is repeated except that a PS resin containing 0.5% by weight of Mitsubishi Carbon #50 is used as the black-colored molding resin in the molding operation conducted prior to the cleaning operation (A) and that the cleaning operation (A) is performed by using 2.0 kg of a cleaning composition prepared by kneading 5 parts by weight of graft polymer ($a_2$) comprised of a main chain of PP and having, grafted thereto, a side chain of PS (PP: 50% by weight; PS: 50% by weight) together with 100 parts by weight of a PS resin having a melt flow rate of 10 g/10 min.

Results are shown in Table 2.

COMPARATIVE EXAMPLE 6

Substantially the same procedure as in Example 6 is repeated except that the cleaning operation (A) is performed by using as a cleaning agent 5.0 kg of a PS resin having a melt flow rate of 10 g/10 min.

Results are shown in Table 2.

EXAMPLE 7

Substantially the same procedure as in Example 1 is repeated except that the cleaning operation (A) is performed by using 1.5 kg of a cleaning composition prepared by kneading 5 parts by weight of graft polymer ($a_3$) comprised of a main chain of PP and having, grafted thereto, a side chain of AS (PP: 70% by weight; AS: 30% by weight) together with 100 parts by weight of an ABS resin having a melt flow rate of 5 g/10 min.

Results are shown in Table 2.

COMPARATIVE EXAMPLE 7

Substantially the same procedure as in Example 7 is repeated except that the cleaning operation (A) is performed by using as a cleaning agent 6.0 kg of an ABS resin having a melt flow rate of 5 g/10 min.

Results are shown in Table 3.

EXAMPLE 8

Substantially the same procedure as in Example 1 is repeated except that the cleaning operation (A) is performed by using 2.0 kg of a cleaning composition prepared by kneading 5 parts by weight of graft polymer ($a_4$) comprised of a main chain of PP and having, grafted thereto, a side chain of AS (PP: 90% by weight; AS: 10% by weight) together with 100 parts by weight of the same AS resin as used as the thermoplastic styrene resin component for preparing the cleaning composition in Example 1.

Results are shown in Table 3.

COMPARATIVE EXAMPLE 8

Substantially the same procedure as in Example 8 is repeated except that the cleaning operation (A) is performed by using 4.0 kg of a cleaning composition prepared by kneading 5 parts by weight of the same graft polymer ($a_4$) as used in Example 8 together with 100 parts by weight of a PP resin.

Results are shown in Table 3.

EXAMPLE 9

Substantially the same procedure as in Example 1 is repeated except that the cleaning operation (A) is performed by using 1.0 kg of a cleaning composition prepared by kneading 5 parts by weight of the same graft polymer ($a_1$) as used in Example 1 together with 100 parts by weight of the same AS resin as used as the thermoplastic styrene resin component for preparing the cleaning composition in Example 1 and that the replacing operation (B) is performed by using Delpet 80N [tradename of a general-purpose, colorless molding material of polymethyl methacrylate (hereinafter referred to as "PMMA") manufactured and sold by Asahi Kasei Kogyo Kabushiki Kaisha, Japan].

Results are shown in Table 3 and FIG. 1.

COMPARATIVE EXAMPLE 9

Substantially the same procedure as in Example 9 is repeated except that the cleaning operation (A) is performed by using 2.0 kg of a cleaning composition prepared by kneading 5 parts by weight of a graft polymer ($b_1$) comprised of a main chain of PMMA and having, grafted thereto, a side chain of AS (PMMA: 50% by weight and AS: 50% by weight) together with 100 parts by weight of the same AS resin as used as the thermoplastic styrene resin component for preparing the cleaning composition in Example 1.

Results are shown in Table 3.

EXAMPLE 10

Substantially the same procedure as in Example 1 is repeated except that the cleaning operation (A) is performed by using 1.5 kg of a cleaning composition prepared by kneading 2 parts by weight of the same graft polymer ($a_1$) as used in Example 1 together with 100 parts by weight of the same AS resin as used as the thermoplastic styrene resin component for preparing the cleaning composition in Example 1 and that the replacing operation (B) is carried out by using a general-purpose, colorless molding PMMA resin.

Results are shown in Table 3 and FIG. 1.

COMPARATIVE EXAMPLE 10

Substantially the same procedure as in Example 10 is repeated except that the cleaning operation (A) is performed by using as a cleaning agent 3.0 kg of the same AS resin as used as the thermoplastic styrene resin component for preparing the cleaning composition in Example 1.

Results are shown in Table 3 and FIG. 1.

EXAMPLE 11

Substantially the same procedure as in Example 1 is repeated except that the replacing operation (B) is performed by using 2.0 kg of a general-purpose, colorless molding PMMA resin.

Results are shown in Table 3 and FIG. 1.

COMPARATIVE EXAMPLE 11

Substantially the same procedure as in Example 1 is repeated except that the cleaning operation (A) is performed by using 2.5 kg of a cleaning composition prepared by kneading 1 part by weight of the same graft polymer ($a_1$) as used in Example 1 together with 100 parts by weight of the same AS resin as used as the thermoplastic styrene resin component for preparing the cleaning composition in Example 1 and that the replacing operation (B) is carried out by using a general-purpose, colorless molding PMMA resin.

Results are shown in Table 3 and FIG. 1.

EXAMPLE 12

Substantially the same procedure as in Example 1 is repeated except that the cleaning operation (A) is performed by using 1.5 kg of a cleaning composition prepared by kneading 100 parts by weight of the same graft polymer ($a_1$) as used in Example 1 together with 100 parts by weight of the same AS resin as used as the thermoplastic styrene resin component for preparing the cleaning composition in Example 1 and that the replacing operation (B) is carried out by using a general-purpose, colorless molding PMMA resin.

Results are shown in Table 3 and FIG. 1.

EXAMPLE 13

Substantially the same procedure as in Example 1 is repeated except that the cleaning operation (A) is performed by using 2.0 kg of a cleaning composition prepared by kneading 160 parts by weight of the same graft polymer ($a_1$) as used in Example 1 together with 100 parts by weight of the same AS resin as used as the thermoplastic styrene resin component for preparing the cleaning composition in Example 1 and that the replacing operation (B) is carried out by using a general-purpose, colorless molding PMMA resin.

Results are shown in Table 3 and FIG. 1.

TABLE 2

| | Molding operation Resin employed before cleaning | | | Cleaning operation (A) Cleaning composition | | | | | | | |
|---|---|---|---|---|---|---|---|---|---|---|---|
| | | | | Thermoplastic styrene polymer | | | | | | Graft polymer | |
| Examples | Molding temperature | Type | Color | Molding temperature | Type | Color | AN % (% by weight) | Melt flow rate | Part by weight | Type | Part by weight |
| Example 1 | 240 | ABS | Black | 240 | AS | Transparent | 34 | 3 | 100 | $a_1$ | 11 |
| Comparative Example 1 | 240 | ABS | Black | 240 | PP | Transparent | — | — | — | — | — |
| Example 2 | 210 | PP | Black | 210 | AS | Transparent | 20 | 3 | 100 | $a_1$ | 11 |
| Comparative Example 2 | 210 | PP | Black | 210 | ABS | Transparent | — | — | — | — | — |
| Example 3 | 220 | PS | Black | 220 | AS | Transparent | 20 | 3 | 100 | $a_1$ | 11 |
| Comparative Example 3 | 220 | PS | Black | 220 | AS | Transparent | 30 | 35 | — | — | — |
| Example 4 | 280 | PPE | Black | 280 | AS | Transparent | 20 | 3 | 100 | $a_1$ | 11 |
| Comparative Example 4 | 280 | PPE | Black | 280 | PP | Transparent | — | — | — | — | — |
| Example 5 | 240 | ABS | Black | 240 | AS | Transparent | 34 | 3 | 100 | $a_1$ | 5 |
| Comparative Example 5 | 240 | ABS | Black | 240 | AS | Transparent | 34 | 3 | 100 | $b_2$ | 2.5 |
| Example 6 | 220 | PS | Black | 220 | PS | Transparent | — | 10 | 100 | $a_2$ | 5 |
| Comparative Example 6 | 220 | PS | Black | 220 | PS | Transparent | — | 10 | — | — | — |

| | Cleaning operation (A) | | | | Replacing operation (B) | | | | | Results (A + B) | |
|---|---|---|---|---|---|---|---|---|---|---|---|
| | Additive | | Required amount (kg) | Required time (minutes) | resin employed next | | | Required amount (kg) | Required time (minutes) | Total amount of employed resin (kg) | Total required time (minutes) |
| Examples | Type | Part by weight *1 | | | Molding temperature | Type | Color | | | | |

TABLE 2-continued

| Examples | *1 | Part by weight | Required amount (kg) | Required time (minutes) | Molding temperature | Type | Color | Additive Part by weight *1 | Required amount (kg) | Required time (minutes) | Total amount of employed resin (kg) | Total required time (minutes) |
|---|---|---|---|---|---|---|---|---|---|---|---|---|
| Example 1 | — | — | 1.0 | 4 | 210 | PP | Transparent | 0.5 | 2 | 1.5 | 6 | |
| Comparative Example 1 | — | — | 10.0 | 32 | 210 | — | — | — | — | 10.0 | 32 | |
| Example 2 | — | — | 0.5 | 2 | 240 | ABS | Transparent | 0.5 | 2 | 1.0 | 4 | |
| Comparative Example 2 | — | — | 8.0 | 27 | — | — | — | — | — | 8.0 | 27 | |
| Example 3 | *2 | 0.5 | 1.0 | 4 | 210 | PP | Transparent | 0.5 | 2 | 1.5 | 6 | |
| Comparative Example 3 | — | — | 6.5 | 22 | 210 | PP | Transparent | 0.5 | 2 | 7.0 | 24 | |
| Example 4 | *3 | 25 | 1.5 | 5 | 210 | PP | Transparent | 0.5 | 2 | 2.0 | 7 | |
| Comparative Example 4 | — | — | 13.0 | 40 | — | — | — | — | — | 13.0 | 40 | |
| Example 5 | — | — | 1.0 | 4 | 210 | PP | Transparent | 0.5 | 2 | 1.5 | 6 | |
| Comparative Example 5 | — | — | 2.0 | 8 | 210 | PP | Transparent | 3.5 | 14 | 5.5 | 22 | |
| Example 6 | — | — | 2.0 | 6 | 210 | PP | Transparent | 1.0 | 4 | 3.0 | 10 | |
| Comparative Example 6 | — | — | 5.0 | 19 | 210 | PP | Transparent | 5.0 | 19 | 10.0 | 38 | |

*1: Part by weight per 100 parts by weight of the cleaning composition
*2: Magnesium stearate
*3: Glass fiber

TABLE 3

| | Molding operation Resin employed before cleaning | | | Cleaning operation (A) Cleaning composition | | | | | | | | |
|---|---|---|---|---|---|---|---|---|---|---|---|---|
| | | | | Thermoplastic styrene polymer | | | | | | | Graft polymer | |
| Examples | Molding temperature | Type | Color | Molding temperature | Type | Color | AN % (% by weight) | Melt flow rate | Part by weight | Type | Part by weight |
| Example 7 | 240 | ABS | Black | 240 | ABS | Transparent | — | 5 | 100 | a₃ | 5 |
| Comparative Example 7 | 240 | ABS | Black | 240 | ABS | Transparent | — | 5 | — | — | — |
| Example 8 | 240 | ABS | Black | 240 | AS | Transparent | 34 | 3 | 100 | a₄ | 5 |
| Comparative Example 8 | 240 | ABS | Black | 240 | PP | Transparent | — | — | 100 | a₄ | 5 |
| Example 9 | 240 | ABS | Black | 240 | AS | Transparent | 34 | 3 | 100 | a₁ | 5 |
| Comparative Example 9 | 240 | ABS | Black | 240 | AS | Transparent | 34 | 3 | 100 | b₁ | 5 |
| Example 10 | 240 | ABS | Black | 240 | AS | Transparent | 34 | 3 | 100 | a₁ | 2 |
| Comparative Example 10 | 240 | ABS | Black | 240 | AS | Transparent | 34 | 3 | — | — | — |
| Example 11 | 240 | ABS | Black | 240 | AS | Transparent | 34 | 3 | 100 | a₁ | 11 |
| Comparative Example 11 | 240 | ABS | Black | 240 | AS | Transparent | 34 | 3 | 100 | a₁ | 1 |
| Example 12 | 240 | ABS | Black | 240 | AS | Transparent | 34 | 3 | 100 | a₁ | 100 |
| Example 13 | 240 | ABS | Black | 240 | AS | Transparent | 34 | 3 | 100 | a₁ | 160 |

| | Cleaning operation (A) | | | Replacing operation (B) | | | | | Results (A + B) | |
|---|---|---|---|---|---|---|---|---|---|---|
| | Additive | | Required amount (kg) | Required time (minutes) | resin employed next | | | Required amount (kg) | Required time (minutes) | Total amount of employed resin (kg) | Total required time (minutes) |
| Examples | Type | Part by weight *1 | | | Molding temperature | Type | Color | | | | |
| Example 7 | — | — | 1.5 | 5 | 210 | PP | Transparent | 1.0 | 4 | 2.5 | 9 |
| Comparative Example 7 | — | — | 6.0 | 20 | 210 | PP | Transparent | 5.0 | 19 | 11.0 | 39 |
| Example 8 | — | — | 2.0 | 6 | 210 | PP | Transparent | 2.0 | 7 | 4.0 | 13 |
| Comparative Example 8 | — | — | 4.0 | 15 | 210 | PP | Transparent | 2.0 | 7 | 6.0 | 22 |
| Example 9 | — | — | 1.0 | 4 | 240 | PMMA | Transparent | 2.0 | 7 | 3.0 | 11 |
| Comparative Example 9 | — | — | 2.0 | 8 | 240 | PMMA | Transparent | 5.0 | 19 | 7.0 | 27 |
| Example 10 | — | — | 1.5 | 5 | 240 | PMMA | Transparent | 2.5 | 10 | 4.0 | 15 |
| Comparative Example 10 | — | — | 3.0 | 11 | 240 | PMMA | Transparent | 6.5 | 22 | 9.5 | 33 |
| Example 11 | — | — | 1.0 | 4 | 240 | PMMA | Transparent | 2.0 | 7 | 3.0 | 11 |
| Comparative Example 11 | — | — | 2.5 | 9 | 240 | PMMA | Transparent | 4.0 | 16 | 6.5 | 25 |
| Example 12 | — | — | 1.5 | 5 | 240 | PMMA | Transparent | 2.0 | 7 | 3.5 | 12 |
| Example 13 | — | — | 2.0 | 6 | 240 | PMMA | Transparent | 2.0 | 7 | 4.0 | 13 |

*1: Part by weight per 100 parts by weight of the cleaning composition

What is claimed is:

1. A method for cleaning the interior of a molding machine having residual molding resin retained therein, which comprises:
   (1) charging a molding machine having a residual molding resin retained in the interior thereof with a cleaning composition, said cleaning composition consisting essentially of (a) a graft polymer comprised of a main chain comprising an olefin polymer and having, grafted thereto, a side chain comprising a styrene polymer and (b) a thermoplastic styrene polymer, said graft polymer (a) being present in an amount of from 2 to 160 parts by weight per 100 parts by weight of said thermoplastic styrene polymer (b),
   (2) operating said molding machine to pass said cleaning composition through said molding machine, thereby removing and withdrawing substantially all of said residual molding resin to the outside of said molding machine and causing a part of said cleaning composition to be retained as a residual cleaning composition in the interior of said molding machine,
   (3) charging said molding machine having said residual cleaning composition retained therein with a fresh molding resin, and
   (4) operating said molding machine to replace said residual cleaning composition with said fresh molding resin, thereby removing and withdrawing said residual cleaning composition to the outside of said molding machine.

2. The method according to claim 1, wherein said thermoplastic styrene polymer (b) has a melt flow rate of from 0.5 to 30 g/10 min.

3. The method according to claim 1, wherein said olefin polymer comprised in the main chain of the graft polymer (a) is selected from the group consisting of polyethylene, polypropylene and an ethylene-propylene copolymer.

4. The method according to claim 1, wherein said styrene polymer comprised in the side chain of the graft polymer (a) is selected from the group consisting of polystyrene, a styrene-acrylonitrile copolymer and a styrene-butadieneacrylonitrile terpolymer.

5. The method according to claim 1, wherein the amount of the olefin polymer comprised in the main chain of graft polymer (a) is from 20 to 80% by weight, based on the weight of the graft polymer (a).

6. The method according to claim 1, further comprising adding water to said cleaning composition prior to step (1), said water being employed in an amount of from 0.2 to 10 parts by weight per 100 parts by weight of the total of the graft polymer (a) and the thermoplastic styrene polymer (b).

7. The method according to claim 1, further comprising adding a lubricant comprising an alkali metal salt to said cleaning composition prior to step (1).

8. The method according to claim 1, further comprising adding an inorganic or organic foaming agent to said cleaning composition prior to step (1).

9. The method according to claim 1, further comprising adding a glass fiber or a glass granule to said cleaning composition prior to step (1).

10. The method according to claim 1, further comprising adding a lubricant comprising an alkali metal salt to said cleaning composition in step (1).

* * * * *